US008220056B2

(12) United States Patent
Owens, Jr.

(10) Patent No.: US 8,220,056 B2
(45) Date of Patent: Jul. 10, 2012

(54) THREAT MANAGEMENT SYSTEM AND METHOD

(75) Inventor: Kenneth R. Owens, Jr., St. Louis, MO (US)

(73) Assignee: Savvis, Inc., Town and Country, MO (US)

( * ) Notice: Subject to any disclaimer, the term of this patent is extended or adjusted under 35 U.S.C. 154(b) by 502 days.

(21) Appl. No.: 12/236,439

(22) Filed: Sep. 23, 2008

(65) Prior Publication Data

US 2011/0239303 A1 Sep. 29, 2011

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................... 726/25; 726/22; 726/23

(58) Field of Classification Search .............. 726/22–25
See application file for complete search history.

(56) References Cited

U.S. PATENT DOCUMENTS

| | | | |
|---|---|---|---|
| 7,138,914 B2 | 11/2006 | Culpepper et al. | |
| 7,185,368 B2 * | 2/2007 | Copeland, III | 726/25 |
| 7,373,666 B2 * | 5/2008 | Kaler et al. | 726/23 |
| 7,594,270 B2 * | 9/2009 | Church et al. | 726/23 |
| 7,757,285 B2 * | 7/2010 | Kubota | 726/23 |
| 2003/0005326 A1 * | 1/2003 | Flemming | 713/201 |
| 2005/0193429 A1 * | 9/2005 | Demopoulos et al. | 726/23 |
| 2005/0257269 A1 | 11/2005 | Chari et al. | |
| 2005/0273851 A1 | 12/2005 | Raju Datla et al. | |
| 2006/0129810 A1 | 6/2006 | Jeong et al. | |
| 2006/0136570 A1 | 6/2006 | Pandya | |
| 2007/0016955 A1 | 1/2007 | Goldberg et al. | |
| 2007/0168311 A1 * | 7/2007 | Genty et al. | 706/60 |
| 2009/0030868 A1 * | 1/2009 | Radhakrishnan et al. | 707/1 |
| 2009/0070880 A1 * | 3/2009 | Harris et al. | 726/25 |

OTHER PUBLICATIONS

International Search Report, International Application No. PCT/US2009/58022, dated Nov. 30, 2009.

* cited by examiner

*Primary Examiner* — Yin-Chen Shaw
*Assistant Examiner* — Jahangir Kabir
(74) *Attorney, Agent, or Firm* — Kenyon & Kenyon LLP

(57) ABSTRACT

In a threat management system and method for managed systems, leveraging of identifications and/or assessments of common threats, and/or valuation of assets which may be susceptible to common threats, can be applied to facilitate monitoring of customer compliance with policies needed to guard against threats to customer assets. Threat identification and response in managed systems may be tailored for different customers, in some instances without having to parse individual customer details, such as assets at risk and types of threats to those assets.

9 Claims, 8 Drawing Sheets

THREAT MANAGEMENT SYSTEM AND METHOD

CROSS-REFERENCE TO RELATED APPLICATION

The present application is related to commonly-assigned application, entitled "Policy Management System and Method," application Ser. No. 12/236,436, filed Sep. 23, 2008.

BACKGROUND OF THE INVENTION

Field of the Invention

The present invention relates to a threat management system and method in managed systems.

A managed services provider can provide turn-key solutions for various customers in a wide range of fields requiring information technology (IT) support. Within these fields, there can be various standards for industry compliance. A managed services provider can help customers comply with those standards. One such area is the security area.

User sites or networks, even when part of a managed services system, can be susceptible to security attack. Customers can define or determine policies, and in some cases can police them, but in some cases policing is difficult, cumbersome, or virtually impossible.

It would be desirable to take advantage of security implementation in a managed services system to facilitate security monitoring and policy compliance for one or more customers within the managed services system.

SUMMARY OF THE INVENTION

In view of the foregoing, it is one object of the present invention to tailor threat identification and response in managed systems for individual users, without having to parse individual user details such as assets at risk, and types of threats that might present a risk to those assets.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Figure 1:
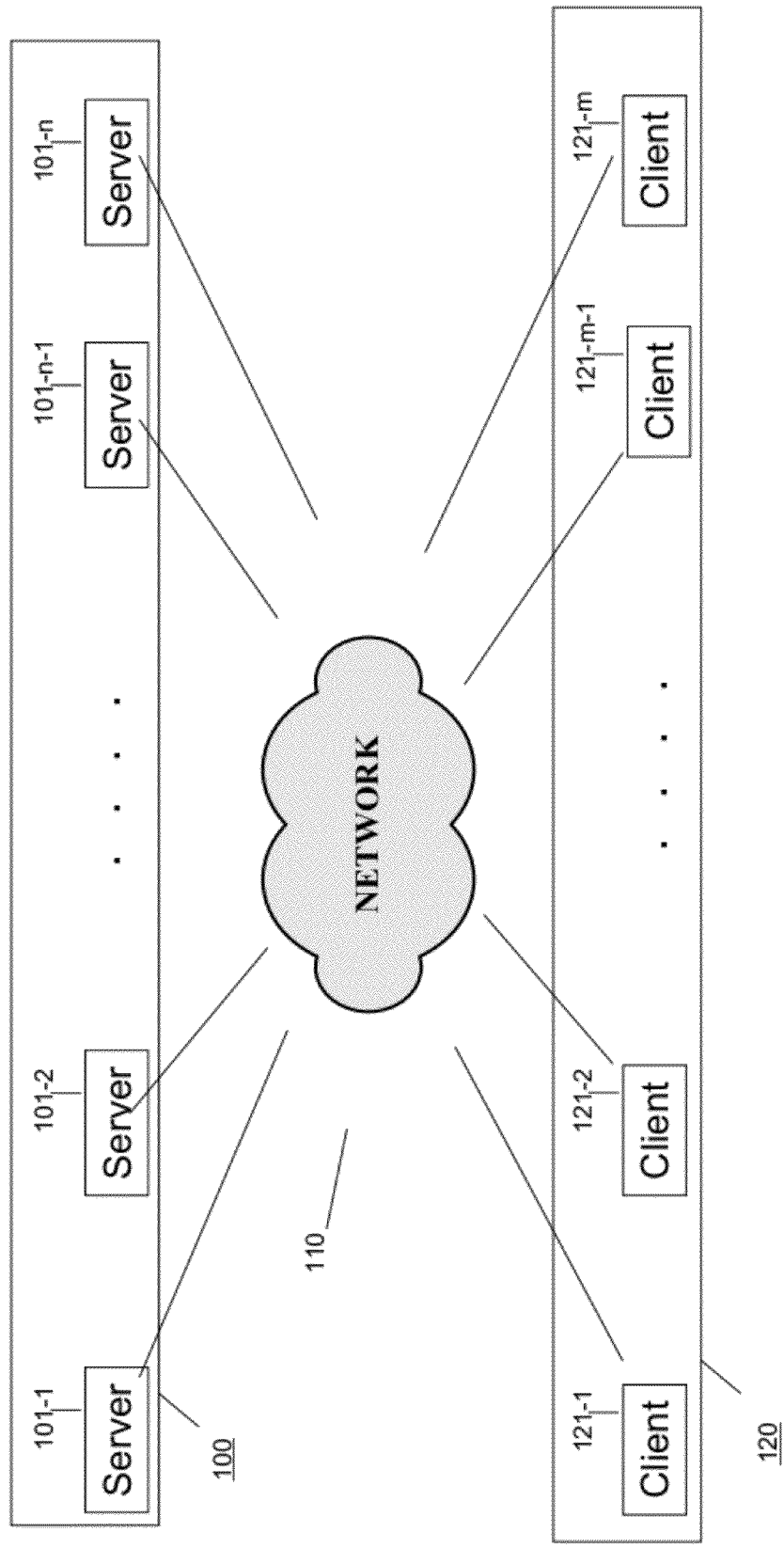
FIG. 1 is a high-level block diagram of a system in which the present invention may be implemented.

FIG. 1 depicts a system which includes one or more servers 101-1, 101-2, . . . , 101-n in a server farm 100; a plurality of clients 121-1, 121-2, . . . , 121-m in a customer system 120; and a network 110, to which either the server farm 100 may be connected, or to which one or more of the servers within server bank 100 may be connected. The customer system 120 may be connected to network 110, or one or more of the clients within customer system 120 may be connected. The network 110 could be a high-speed connection, or a set of high-speed connections between the server farm 100 and the customer system 120, or in one embodiment, may be the Internet.

Figure 2:
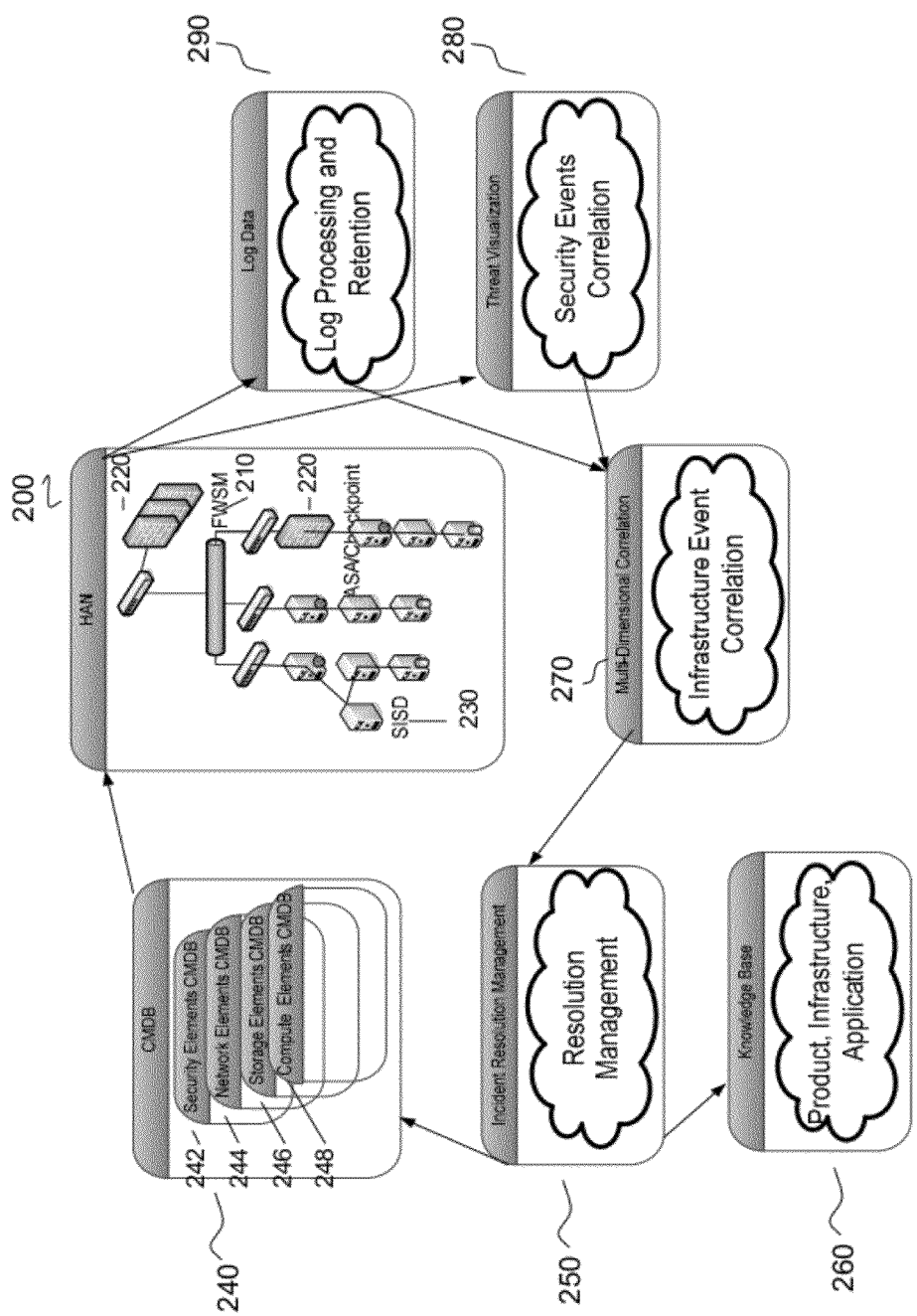
FIG. 2 is a more detailed, but still high-level diagram identifying some elements of a system in which the present invention may be implemented.

FIG. 2 depicts a high level hardware configuration including a network termed a hosting area network (HAN) 200. The HAN 200 may include hardware (including various kinds of servers, including server farm 100 and associated servers; possibly one or more storage area networks (SANs); accompanying networking infrastructure (including but not limited to backbones and routers); a firewall services module (FWSM) 210, and other firewall infrastructure 220 as needed. In FIG. 2, the firewall infrastructure may include technology from Cisco (including Cisco's ASA™). A server may include a computing device with a single instruction single data stream (SISD) processor, such as SISD machine 230. Other hardware (unnumbered) in HAN 200 may includes Web servers, application servers, and/or database servers, which may be interconnected to and among each other in ways well known to ordinarily skilled artisans.

In one aspect of the invention, HAN 200 contains the hardware for providing managed services to one or a plurality of customers. Each customer may have one or more servers dedicated to managing services for that customer. HAN 200 would also contain a platform for centralizing relevant information, including but not limited to types of assets; types of threats, and possible counters to different types of threats. Different customers may have different assets to protect; may be susceptible to different kinds of threats; and may operate in an environment in which different counters to common threats may have the same or varying degrees of effectiveness.

In managing services for a customer, in one aspect of the invention, relative values or weights may be assigned to the customer's assets, and to potential threats to those assets, in order to prioritize threat handling for that customer. Customer specific data may be combined with common or centralized data to determine those values or weights for that customer.

Turning back to FIG. 2, there are various modules which may comprise software housed on separate servers or common servers within HAN 200, or may be separate components themselves. One or more of these modules may be distributed among different servers and/or different customers, or may be housed centrally for use with a plurality of customers, or some combination of these possibilities. These modules include, among others, a configuration management database (CMDB) 240, which may include separate CMDBs for various aspects of managed services, including a security elements CMDB 242, a network elements CMDB 244, a storage elements CMDB 246, and a compute elements CMDB 248. These CMDBs 242-248 may reside on the same set of servers; a separate bank of centralized servers; or on servers used with particular customers, depending on the services being managed.

Figure 3:
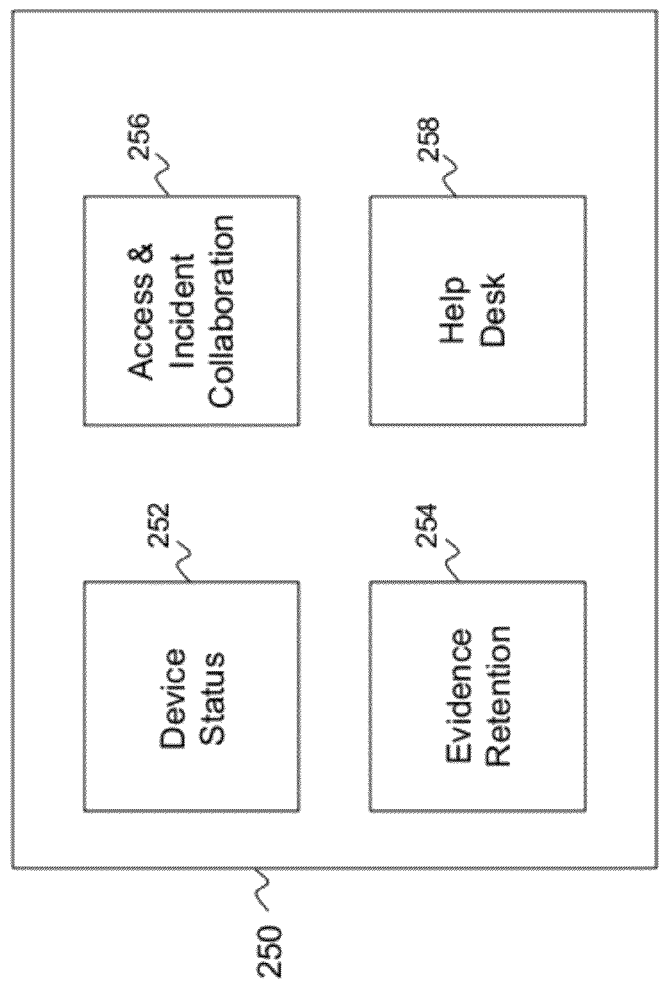
FIGS. 3-7 are block diagrams of some of the elements depicted in FIG. 2.

FIG. 2 also shows an incident resolution management module 250. In the managed services field, workflows are important to organize and maintain. The incident resolution management module 250 provides integrated workflow for managing incident resolution. (In the context of the present invention, an "incident" may be a threat to a customer's assets (computing systems and/or networks). As seen in FIG. 3, this module 250 can include a module 252 for viewing device status, particularly workflows. In one aspect of the invention, workflows for incident resolution may be triggered by violations of policies related to threat management. By monitoring such policies, the security aspect of managed services can identify, contain, and address such policy violations. Policy monitoring for compliance also provides assurances or safeguards for application of appropriate or necessary updates, or threat or asset identifications or definitions.

Also in FIG. 3, an evidence retention module 254 can assist in handling an incident by enabling attachment of relevant data, including but not limited to data in the form of documents, images, audio, traffic capture, reports, charts, and the like, to a particular file or case pertaining to that incident, to provide an evidence file. In one aspect, the data may have error-correction or integrity-checking data, including cryptographic data, associated therewith in order to assure the integrity of the data.

A role-based access and incident collaboration module 256 permits, among other things, assignment of incident cases to different users, and/or sharing of those cases within a group. As has been noted previously, different customers will face different threats to their respective assets. To the extent that any customers face common threats and/or common types of assets, common solutions or counterattacks to threats may be devised and/or implemented. In one aspect of the collaboration, case data may be managed so as to allow application of granular access controls. Appropriate granularity can ensure that multiple analysts may collaborate on a case, while accessing only case data that each analyst needs to know. Different analysts may access the same data, different data, or different amounts of data. In any event, the granularity of access in accordance with one aspect of the invention allows appropriate authorization structures. In another aspect of module 256, system user actions may be logged so that an appropriate audit trail may be retained.

Incident resolution management module 250 also may permit integration with a central help desk via help desk integration module 258. In one aspect, this help desk integration may facilitate communication with different types of managed services, possibly including not only security groups, but also hosting groups, network operations groups, and change management groups. For example, where a particular security patch needs to be applied commonly to multiple managed systems, a common help desk approach can facilitate consistent application of the patch.

Figure 4:
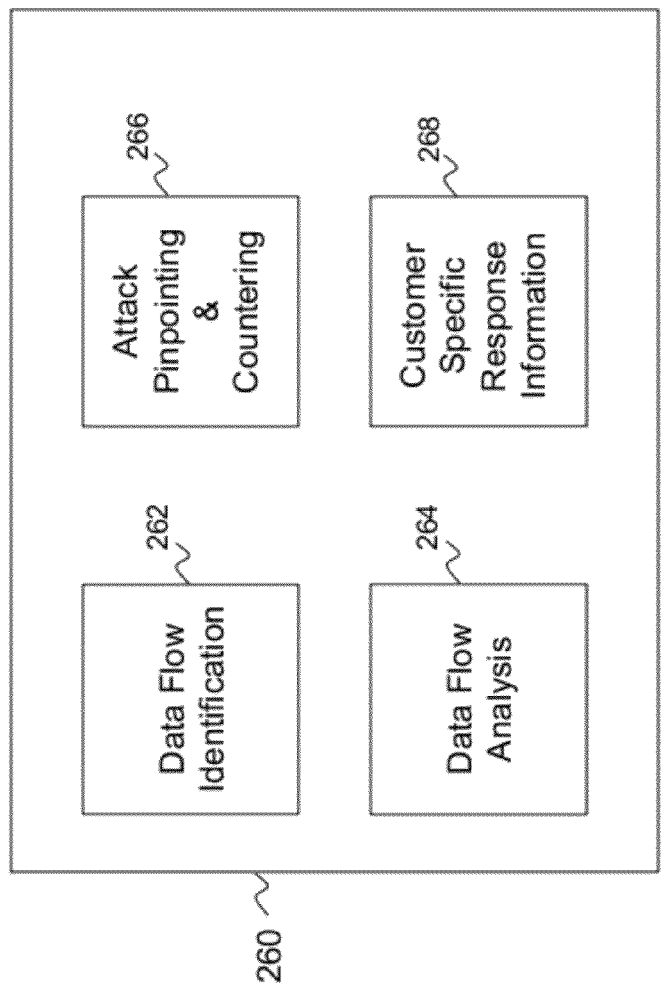

FIG. 2 also shows a knowledge base module 260, which in turn is shown in more detail in FIG. 4. In one aspect, knowledge base module 260 identifies data flows (in identification module 262); analyzes those flows as necessary (in analysis module 264) to determine their characteristics; enables pinpointing of attacks or threats so as to facilitate countering the attacks/threats (in pinpointing and countering module 266); and retains customer-specific data (in customer specific response information module 268) to enable provision of event response information at the necessary level of specificity.

In one aspect, module 268 may retain information about previous incidents affecting different customers, in order to facilitate the delivery of information at the appropriate granularity. In another aspect, the elements within knowledge base module 260 cooperate to facilitate the provision of threat containment and/or remediation steps to the appropriate managed services, including network services, hosting services, and/or configuration management.

Figure 5:
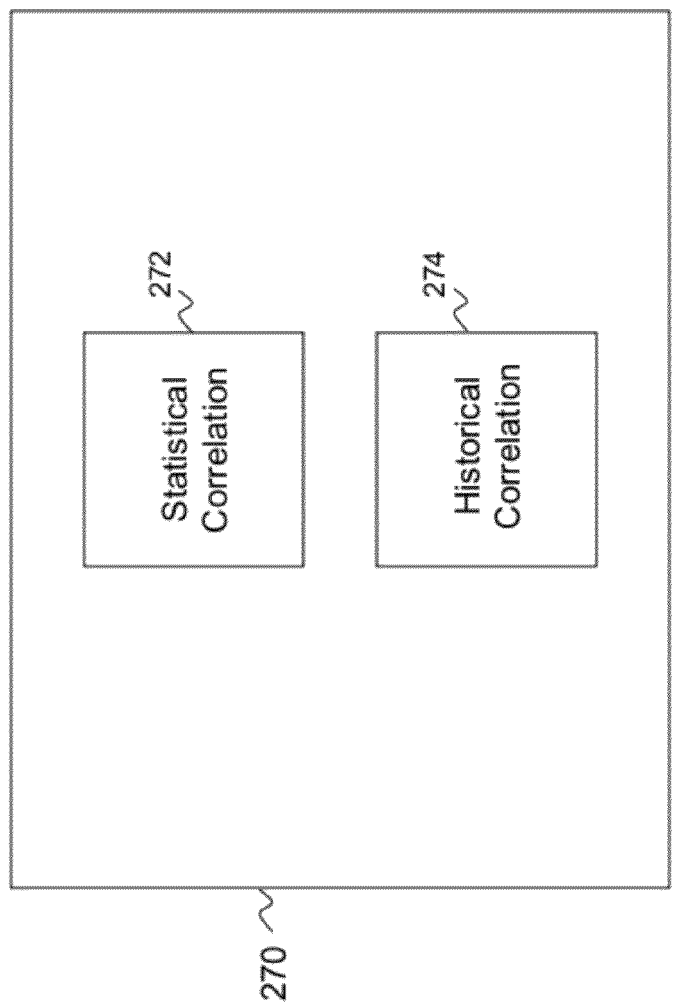

FIG. 2 also shows a multi-dimensional correlation module 270, which in turn is shown in more detail in FIG. 5. For example, FIG. 5 shows a statistical correlation module 272 which may use any of a number of statistical algorithms, alone or in combination, and may apply those algorithms to threat values and assets values associated with customers to determine incident severity. These or other algorithms also may be used to determine prevalence of anomalous event patterns (which may or may not represent threats). Network behavior also may be analyzed as part of threat identification.

Also in FIG. 5, historical correlation module 274 enables identification of repeating patterns of network attacks. In one aspect, such patterns may be masked, submerged, or otherwise hidden in various patterns of otherwise normal network events, or even in flows of other security events. By accumulating a history of such threats through diagnosis of past events, module 274 facilitates prevention of repeat attacks through early pattern recognition. In some cases, the attacks may be automated, or may be slow in comparison with surrounding network events. In either case, the historical correlation module 274 may accumulate data on those events and attacks.

In one aspect of the invention, the policy or policies that a managed services customer sets may drive the response to the attack. The customer may be able to determine the action to be taken. The response could be automated. For example, the data in question may be dropped; the data may be marked as suspicious or otherwise problematic and passed on; an alert may be sent (with the managed services provider being able to monitor alerts); or the customer may receive an e-mail. Other options will be evident to ordinarily skilled artisans.

In the managed services context of the present invention, by having multi-correlation module 270 work in conjunction with one or more other modules, it becomes possible for the inventive system not only to handle threats to individual customer assets on a granular basis, but also to learn from other threat/asset type combinations that other customers have faced and provide enhanced threat responses. It also becomes possible to provide successful threat responses to threats that a particular customer may not have faced, but another customer had.

In addition, one overall effect of the cooperation of the statistical correlation module 272 and the historical correlation module 274 is to enable proactive information management, and in particular, proactive threat handling. The more powerful the algorithms used in statistical correlation module 272, and/or the more complete the data in historical correlation module 274, the more comprehensive the resulting threat handling capabilities.

FIG. 2 shows a threat visualization module 280, which may be used in achieving correlation of security events. In one aspect, the module 280 may be used to provide an overall view of a customer's compliance status with security policies and/or requirements, and thus provide an indication of the overall security health of a managed customer site.

Figure 6:
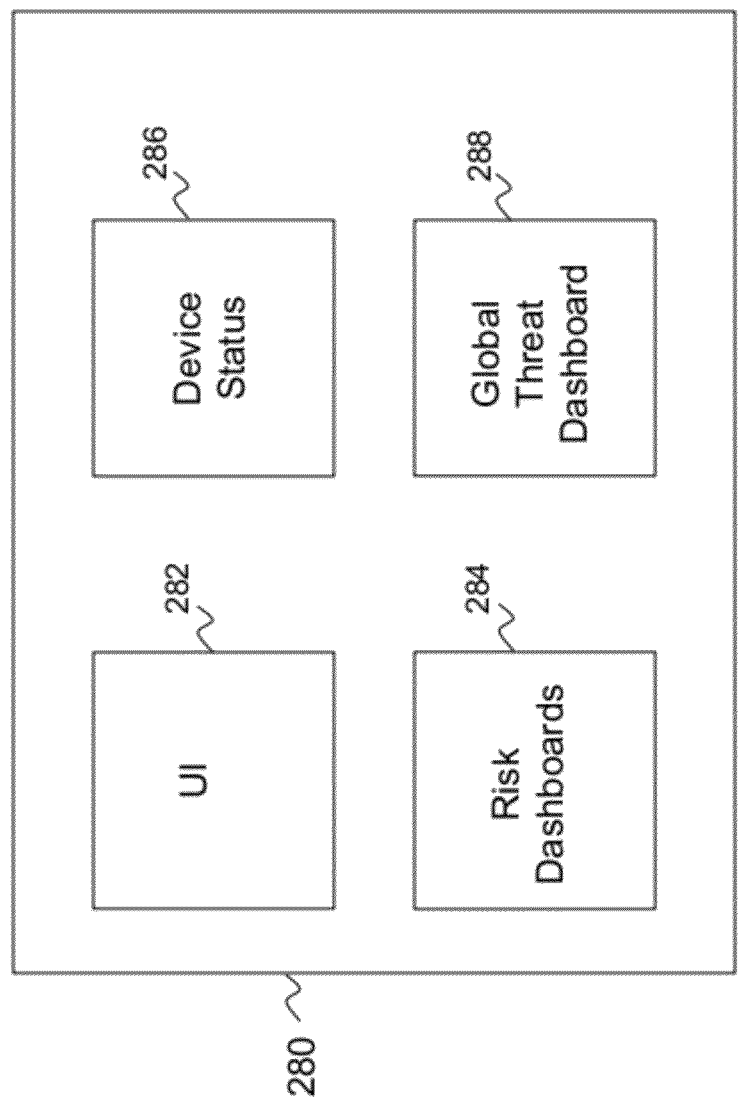

Looking at FIG. 6 which shows the module 280 in more detail, a user interface 282 may facilitate viewing of security incidents. Both the managed services customer and the managed services provider may view the incidents. In addition to viewing security incidents, the user interface 282 may facilitate viewing of workflows for identifying and handling security events (threats, updates of threat management software, etc.), so as to guide a user through the resolution of security incidents. Opening, editing, and/or closing of security incidents also may be facilitated.

Another visual aspect of the threat visualization module 280 is the provision of one or more so-called "risk dashboards" 284. These can take one or more forms. In one form, graphical, pictorial, or other descriptive realtime presentations (e.g. snapshots) of a customer's security status or health may be provided. The presentations may be based on security-related data from the customer's own managed or hosted infrastructure. Threat status also may be represented.

Among the visualization tools that may be employed in risk dashboards 284 are tools that enable customers to manage their security risk and ensure that they are meeting the security standards they want and/or need to meet. Various metrics may be made available or displayed. In a situation in which a customer may have identified a baseline risk level, or has had a baseline risk level identified, one or more of the dashboards may display that baseline risk level, and also may display deviations from that baseline risk level. This kind of management tool is useful for customers to manage their own risk, but also facilitates risk analysis by managed service providers, who then can advise customers as to compliance with applicable and/or desirable security standards.

Another viewer, a device status viewer 286, permits viewing of device status across a network, be it the HAN 200 or another network for which a managed services provider may be responsible. Real-time viewing of device and/or network status facilitates configuration management, security management, and other policy management, even from a central center, such as a security operations center.

In some security situations, there are threats which may appear from time to time on a relatively widespread basis among multiple customers in a managed services situation, or may appear on a widespread basis in a managed services system because those threats are prevalent in other networks (irrespective of whether those threats are within managed systems). Particular attackers may become relatively visible or prevalent. Such information may be accumulated and made part of knowledge base module 260, for example. In such a circumstance, a global threat dashboard 288 may provide an overall map of a managed services system, and may plot on that map the presence of particular types of attacks—for example, attacks determined to be among the 10 most prevalent within the particular managed system, or the most prevalent within a different or larger network arena. Such data, as with other threat data, may be correlated, for example, through multi-dimensional correlation module 270, and viability of the threats may be measured against customer assets and corresponding asset values.

Figure 7:
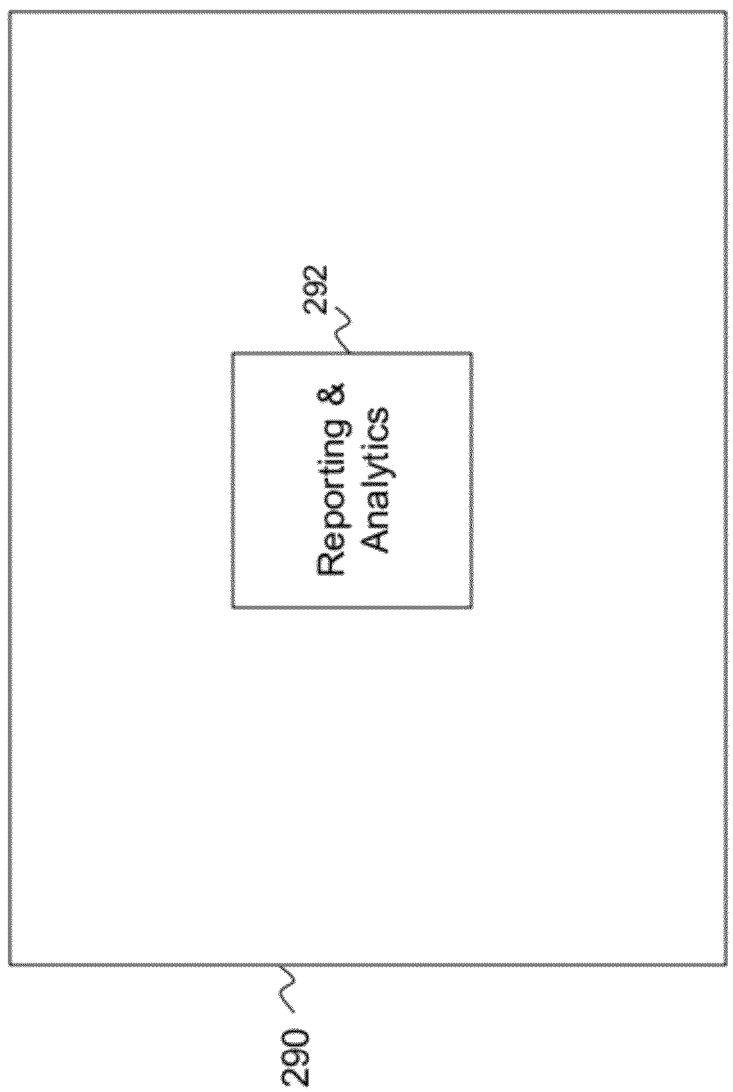

Finally, FIG. 2 shows a log data module 290, which will be described in more detail with reference to FIG. 7. The log data module 290 may contain appropriate tools to facilitate keeping track of security, log, and application data. Security policy monitoring and policy compliance monitoring may require tracking of this kind of data. In one embodiment, in addition to what is provided in threat visualization module 280, log data module 290 may contain reporting and analytics module 292 to facilitate implementation and monitoring of security compliance controls; enhance risk management; facilitate performance management; and implement other security-related operational goals that will be readily apparent to ordinarily skilled artisans.

Either log data module 290 or threat visualization module 280 may contain dashboards to provide information in formats tailored to the needs of security analysts, operators, and the like. Log data module 290 also may measure and/or record such varied data as risk exposure or security compliance. Reporting facilities within module 290 also may permit generation of security information in forms tailored for particular types of users.

It should be noted that, while the arrows in FIG. 2 are unidirectional, they may be bi-directional. Moreover, any of the modules and/or elements in FIG. 2 may communicate either directly with each other, or indirectly through one or more modules, to carry out the necessary threat management functions. Still further, while particular functions may have been ascribed to particular modules in the course of discussing various embodiments, it should be noted that the invention is not so limited. Merely by way of example, performance of any of the analytics discussed above may be carried out in or otherwise combined into visualization module 280, so that computation and display may be collocated. Likewise, correlation in module 270 may be performed either in visualization module 280 or incident resolution management module 250, to collocate related functions. Other combinations will be apparent to ordinarily skilled artisans.

Figure 8:
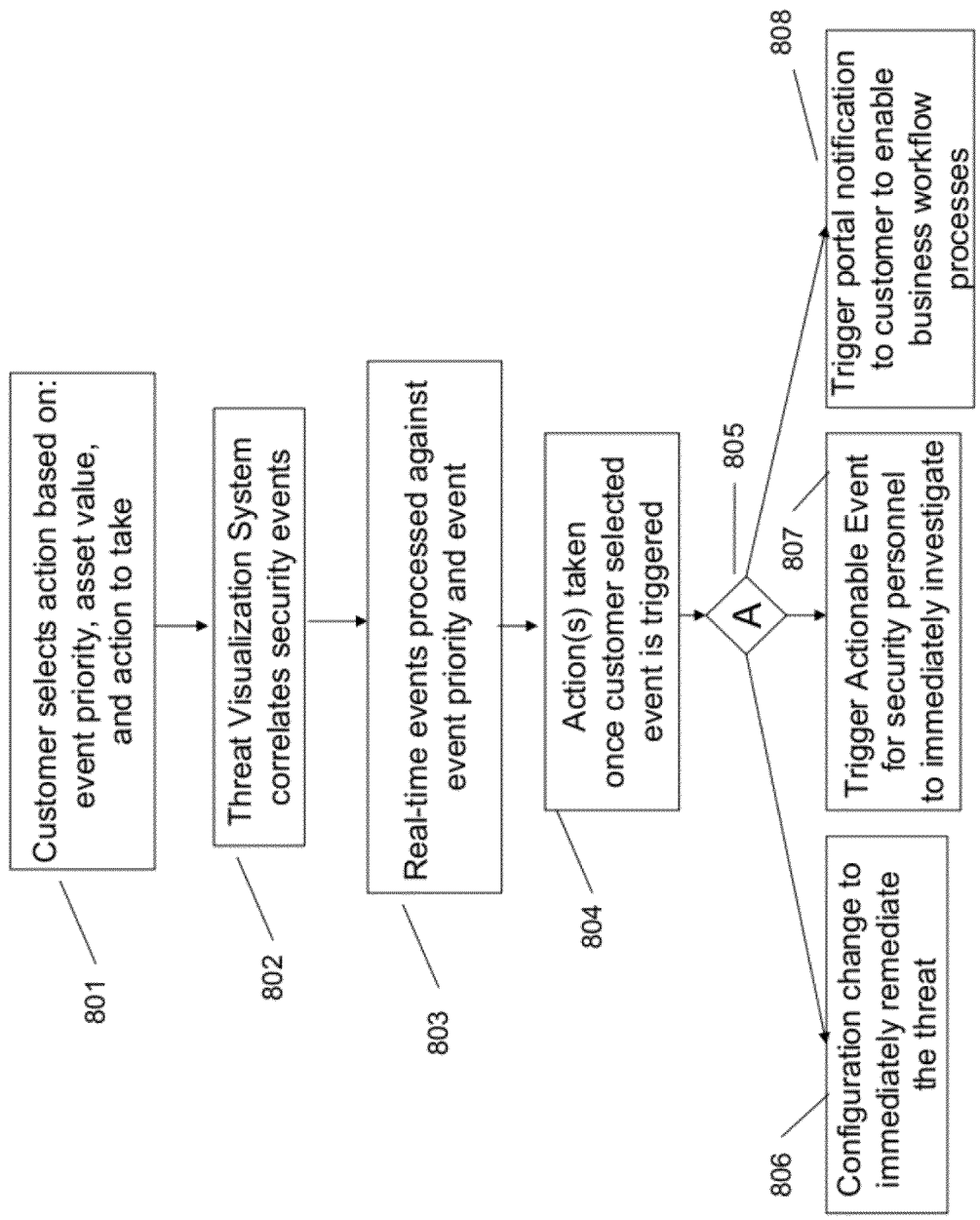
FIG. 8 is a flow chart describing one aspect of the invention.

FIG. 8 shows a flowchart depicting one aspect of the invention. According to this aspect, managed services customers are able to select their own security standards, with the managed services provider giving feedback and, where appropriate, recommending enhancements, or perhaps recommending remediation of a threat that may have resulted from the customer's selection. At 801, a customer may select an action based on asset value, importance of potential threat (event priority), and the action to be taken. After the customer makes the selection, at 802, the threat visualization system or module (item 280 in FIG. 2 and FIG. 6) performs the necessary correlation of security events. At 803, then, events as they occur are processed against the customer-selected priority and the security event, and at 804, the appropriate actions are taken in response to a triggering of the customer event.

Once the customer event is triggered, any or all of actions 806-808 may be taken, as signified by the branch at 805. At 806, there may be a configuration change, i.e. a change in the security parameters (such as through deployment of an access control list to a network router, or the addition of a firewall rule to cause traffic to be dropped or otherwise flagged) in order to remediate the threat. At 807, security personnel may be instructed to investigate immediately. In one embodiment, this may be accomplished by the triggering of an actionable event. At 808, the customer's business workflow processes may be triggered by a portal notification to the customer.

It should be noted that, while FIG. 8 shows an aspect of the invention in which a managed services customer manages its own security policy and compliance, a managed services provider may perform part or all of that that management instead. This alternative may have merit in instances in which a managed services provider can avail itself of relevant, or even analogous information concerning other managed services customers and their own assessment of assets and threats to those assets. Thus, for example, 801 in FIG. 8 may be carried out by a managed services provider instead of a customer; and 803 may be performed in response to a provider action rather than a customer action.

Taking the foregoing into account, then, in accordance with one aspect of the invention, data relating to network threat type and prevalence may be analyzed statistically. Network assets are classified according to importance, and also may be classified according to type of attack(s) or threat(s) to which the assets may be susceptible, and according to statistical likelihood of a threat or attack being present. In one aspect, combinations of the threat data and the associated assets at risk may be assigned a value which takes into account the degree of danger that a particular threat presents, and the value of an asset to a particular customer. It then would be possible to decide whether to take steps to address the threat in light of the overall risk presented.

Various ones of the above-described modules may cooperate to provide enhanced analytics, including but not limited to, in one aspect, the ability to identify upward or downward trends in threats to different network types in different environments. In one aspect of the invention, it may be possible to identify trends in one or more of application performance or network performance within a particular customer site, or across customer sites.

Configuration policies for networks; servers within networks; and/or security generally may be enhanced as well, through synergies achieved by applying one customer's security experience (in terms of asset value and threat value, for example), to one or more other customers.

The correlation modules described above may be viewed, in one aspect, as correlation engines. In conjunction with historical and actual data received from other modules, a trending engine may be devised, and used to predict upward or downward trends in threats and/or network or application performance.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method of automating network threat responses, the method comprising:
    enabling a customer to enter a customer supplied assessment of assets and threats to the assets;
    identifying, through a processing device, types of assets of the customer in a hosting area network susceptible to network attack, the assets comprising physical computing system and networking resources
    providing managed services in the hosting area network to a plurality of customers, each customer having a dedicated set of the resources;
    comparing the identified types of assets of the customer to the types of assets of other customers of the hosting area network to identify other customers having similar types of assets;
    comparing asset values of the identified other customers having similar types of assets to the customer supplied assessment of assets and threats to identify the asset values of the identified other customers corresponding to the customer supplied assessment of assets and threats;
    assigning an asset value to each type of asset of the customer based on the identified asset values of the other customers corresponding to the customer supplied assessment of assets and threats;
    identifying types of threats of network attack to the assets of the customer;
    comparing the identified types of threats to the assets of the customer to the types of threats faced by the other customers of the hosting area network having similar types of assets to identify other customers facing similar types of threats;
    comparing threat values of the identified other customers facing similar types of threats to the customer supplied assessment of assets and threats to identify the threat values of the identified other customers corresponding to the customer supplied assessment of assets and threats;
    assigning a threat value to each type of threat to the assets of the customer based on the identified threat values of the other customers corresponding to the customer supplied assessment of assets and threats;
    applying a first statistical algorithm to events in the hosting area network to identify anomalous event patterns;
    comparing the identified anomalous event patterns to accumulated historical data on prior attacks and events stored in a historical correlation module to identify actual threats from an attack;
    applying a second statistical algorithm to the assigned asset value, the assigned threat values, and the identified actual threats to identify a severity of the actual threats for the customer; and
    plotting on a map of the hosting area network at least one of the actual threats identified as severe.

2. A method as claimed in claim 1, further comprising: selectively blocking access to said network in accordance with said identified severity.

3. A method as claimed in claim 2, wherein said selectively blocking comprises blocking access to particular Internet ports.

4. In a managed services system providing managed services to a plurality of customers, an automated network threat response system comprising:
    a processing device configured to execute instructions to instantiate a plurality of threat response modules including:
        a knowledge base module configured to retain threat solutions associated with asset types and security threats, retain information about previous incidents affecting a plurality of customers to identify a granularity of data delivered to the customer and provide threat containment, and plot on a map of the hosting area network at least one actual threat identified as severe at the identified granularity;
        a correlation module configured to:
            enable a customer to enter a customer supplied assessment of assets and threats to the assets;
            identify, through a processing device, types of assets of the customer in a hosting area network susceptible to network attack, the assets comprising physical computing system and networking resources providing managed services in the hosting area network to a plurality of customers, each customer having a dedicated set of the resources;
            compare the identified types of assets of the customer to the types of assets of other customers of the hosting area network to identify other customers having similar types of assets;
            compare asset values of the identified other customers having similar types of assets to the customer supplied assessment of assets and threats to identify the asset values of the identified other customers corresponding to the customer supplied assessment of assets and threats;
            assign the identified asset value to each type of asset of the customer based on the comparing; identifying types of threats of network attack to the assets of the customer;
            compare the identified types of threats to the assets of the customer to the types of threats faced by the other customers of the hosting area network having similar types of assets to identify other customers facing similar types of threats;
            compare threat values of the identified other customers facing similar types of threats to the customer supplied assessment of assets and threats to identify the threat values of the identified other customers corresponding to the customer supplied assessment of assets and threats;
            assign the identified threat value to each type of threat to the assets of the customer;
            apply a first statistical algorithm to events in the hosting area network to identify anomalous event patterns;

compare the identified anomalous event patterns to accumulated historical data on prior attacks and events stored in a historical correlation module to identify actual threats from an attack;

apply a second statistical algorithm to the assigned asset value, the assigned threat values, and the identified actual threats to identify a severity of the actual threats for the customer;

a management module, working with the correlation module, configured to manage responses to said security threats; and an incident resolution module, working with the correlation module, configured to resolve security threats in said managed services system.

5. A system as claimed in claim 4, further comprising a visualization module configured to facilitate visualization of the plotted at least one threat.

6. A system as claimed in claim 4, further comprising a log data module configured to record threat events in said managed services system.

7. A system as claimed in claim 4, wherein a managed services provider develops the threat solutions contained in the knowledge base module.

8. A system as claimed in claim 4, wherein the correlation module obtains said threat values from said customer, based on the customer's own assessment.

9. A system as claimed in claim 4, wherein the correlation module obtains said asset values from said customer, based on the customer's own assessment.

* * * * *